United States Patent [19] | [11] 4,225,882
Moiroud et al. | [45] Sep. 30, 1980

[54] METHOD AND A DEVICE FOR ANALYZING A PYROELECTRIC TARGET

[75] Inventors: Guy Moiroud; Serge Véron, both of Paris, France

[73] Assignee: Thomson-CSF, Paris, France

[21] Appl. No.: 853,175

[22] Filed: Nov. 21, 1977

[30] Foreign Application Priority Data

Nov. 26, 1976 [FR] France ................................ 76 35750

[51] Int. Cl.[2] ........................ H04N 5/33; H01J 31/49; H04N 5/34

[52] U.S. Cl. .................................... 358/113; 358/222; 250/333; 315/10

[58] Field of Search ............... 358/113, 217, 222, 223; 250/333, 330, 338; 315/10

[56] References Cited

U.S. PATENT DOCUMENTS

| | | | |
|---|---|---|---|
| 3,646,267 | 2/1972 | Tompsett | 358/113 |
| 3,946,232 | 3/1976 | Harmer | 250/333 |
| 4,100,574 | 7/1978 | Felix | 358/113 |

FOREIGN PATENT DOCUMENTS

| | | | |
|---|---|---|---|
| 1395741 | 5/1972 | United Kingdom | 358/113 |

*Primary Examiner*—Robert L. Griffin
*Assistant Examiner*—Edward L. Coles
*Attorney, Agent, or Firm*—Roland Plottel

[57] ABSTRACT

A method and a device for analyzing a pyroelectric target in an evacuated envelope. The target with two opposite faces has a first face disposed towards a zone of the envelope which is transparent to an incident radiation. The second face is orientated towards an electron gun generating device which operates at least one electron beam. A first scanning of the pyroelectric target with a high intensity low resolution electron beam allows a stage of neutralization of the electron charges induced in the target by the incident radiation. The stage of neutralization is to be considered as effecting a storage of the signal recorded on the target. A second scanning of the pyroelectric target with an electron beam of high resolution and low intensity corresponds to a stage of read-out proper of the target. The device is provided, on the one hand, with circuits for the control of the intensity of emission of the electron beam and, on the other hand, with circuits for the control of the voltage applied to the pyroelectric target, positive boosts of potentials being applied to the target during the stage of neutralization and read out proper. A common control circuit controlled by a synchronization signal representing the emission recurrences signals of the incident radiation controls the circuits for the control of the intensity of emission of the electron beam and the circuit for the control of the voltage applied to the target.

6 Claims, 5 Drawing Figures

METHOD AND A DEVICE FOR ANALYZING A PYROELECTRIC TARGET

The present invention relates to a method of and a device for analysing a pyroelectric target for use, for example, in a camera tube.

In camera tubes of pyroelectric target type such as tubes known by the brand name "Pyricon", the energy transmitted by an incident radiation received on the target, heats the latter up and causes the appearance at the irradiated point on the target and on both faces thereof, of two equal quantities of positive and negative charges. Scanning of one of the faces of the target by an electron beam makes it possible under certain conditions to neutralize these charges, and to pick up a read-out signal corresponding to the value of the incident radiation.

Since, through the intermediary of the target, the tube is only sensitive to variations in temperature, it is necessary, in order to obtain a recording signal on the target, for the incident energy to vary as a function of time. This variation can be achieved either by modulating the stream of incident radiation through the use of a shutter device, or by relative displacement of the target in relation to the incident radiation.

Whatever the case, the resolution factor of the tube depends upon the time separating the arrival of the stream of radiation from the read-out of the target by the electron-beam, the thermal energy generated by this radiation diffusing laterally to the pyroelectric material by the mechanism of thermal conduction. The resolution is inversely proportional to $\sqrt{DT}$, where D represents the heat diffusion constant of the material of which the target is made and T the length of the standard field period of the scanning system.

To achieve good resolution on the part of target and tube, it is necessary to read the charges very rapidly after irradiation. For this reason, in the embodiment utilising a shutter device, it is necessary to increase the shutter frequency and to use a scanning standard of high frequency. However, in these conventional read-out methods, the duration of the field period, T, is limited to a minimum value below which read-out of the charges becomes incomplete, giving rise to the known phenomenon of delayed start-up occurring in camera tubes.

This minimum value on the part of the field period corresponds to the time constant C/g, where C represents the capacitance of the target scanned by the beam and g the beam conductance.

To achieve maximum resolution, various solutions have been proposed in order on the one hand to reduce C and on the other hand to increase g.

The reduction of C is in particular achieved by using for the target, materials of low dielectric constant $\epsilon$ and high pyroelectric coefficient, such as triglycine sulphate, or TGS, and derivatives thereof. The need to achieve a low value of C makes it impossible to use materials in which the ratio P/CV, where P represents the pyroelectric coefficient of the material and CV the specific heat at constant volume, is high, i.e. materials such as tantalum-doped lead titanozirconate for example.

The increase in g is obtained by effecting read-out of a strong signal by the addition, to the charges of pyroelectric origin, of positive charges created either by ions or by secondary emission generated by a beam of fast electrons.

These additional charges correspond to a current I referred to as the pedestal current in the art of pyroelectric target tubes and camera tubes. The beam conductance g is proportional to I/Vo, where Vo represents the energy dispersion factor of the electrons in the read-out beam.

In accordance with the conventional mode of operation of pyroelectric target tubes, the current I cannot be increased beyond a given value which is limited by the deterioration in the original pyroelectric signal, brought about by the non-uniformity in I for the overall target and by the need to obtain a read-out beam which has good resolution.

The object of the present invention is to overcome the aforesaid drawbacks and the invention relates to a method of analysing a pyroelectric target tube, using electron beam scanning, which consists in storing the signal recorded on the target at the time of heating up of the latter during irradiation of the latter, through neutralisation of the electrical charges appearing on the target during said heating, said storage preceding a read-out stage proper in which the pyroelectric target is read-out after it has cooled.

The invention likewise relates to a pyroelectric target analysing device comprising said target within an evacuated envelope a first face of the target being disposed towards a zone of said envelope which is transparent vis-a-vis an incident radiation, and comprising means for the scanning by an electron beam of a second face of said target, opposite to the first, said second face of the pyroelectric target being disposed towards means generating at least one electron beam and connected to a means controlling the intensity of emission of said beam, the pyroelectric target being connected to voltage control means and the voltage control means and the means controlling the emission intensity being connected to a common control circuit.

In accordance with the invention, the storage of the information recorded on the target during the time of the latter's heating, makes it possible to achieve an image of high resolution.

The object of the present invention is applicable in particular to camera tubes for use with infrared radiation.

The invention will be better understood from a consideration of the ensuing description and the attached drawings in which:

FIG. 1 schematically illustrates a sequence of analysing of a pyroelectric target in accordance with the invention;

FIG. 2 likewise schematically illustrates an embodiment of a sequence of analysing of a pyroelectric target in accordance with the invention;

In operation of pyroelectric targets, the charges appearing when the target is heated as a consequence of the incident radiation, are replaced, after neutralisation during the period of cooling of the target, by charges of equal quantity but opposite sign.

In accordance with the invention, fast neutralisation of charges brought about by heating up of the target during the latter's irradiation, gives rise to the appearance during the subsequent period of cooling of the target, of charges equal and opposite to the neutralised charges and conserving the information corresponding to the neutralised charges. The appearance of charges of equal quantity and opposite sign to the charges generated during the heating phase, corresponds to a storage of the information associated with these charges, by reconstitution of the charges, and to a reconstitution of an image of high resolution.

The waiting time preceding read-out proper (that is to say, read-out of the target) corresponds to the thermal time constant of the target during which all of the charges of opposite sign are generated. This time constant is $\tau_c=(a^2/4\pi^2D)$, where a is the pitch of the test card, D the heat diffusion constant of the material of which the target is made. In the case of triglycine sulphate, $\tau_c=1$ millisecond for a=10 pairs of lines per millimeter.

The neutralisation of the charges generated by the heating of the target can be performed very quickly by scanning the target with an unfocussed electron beam, that is to say one of low resolution and high intensity.

Figure 1:
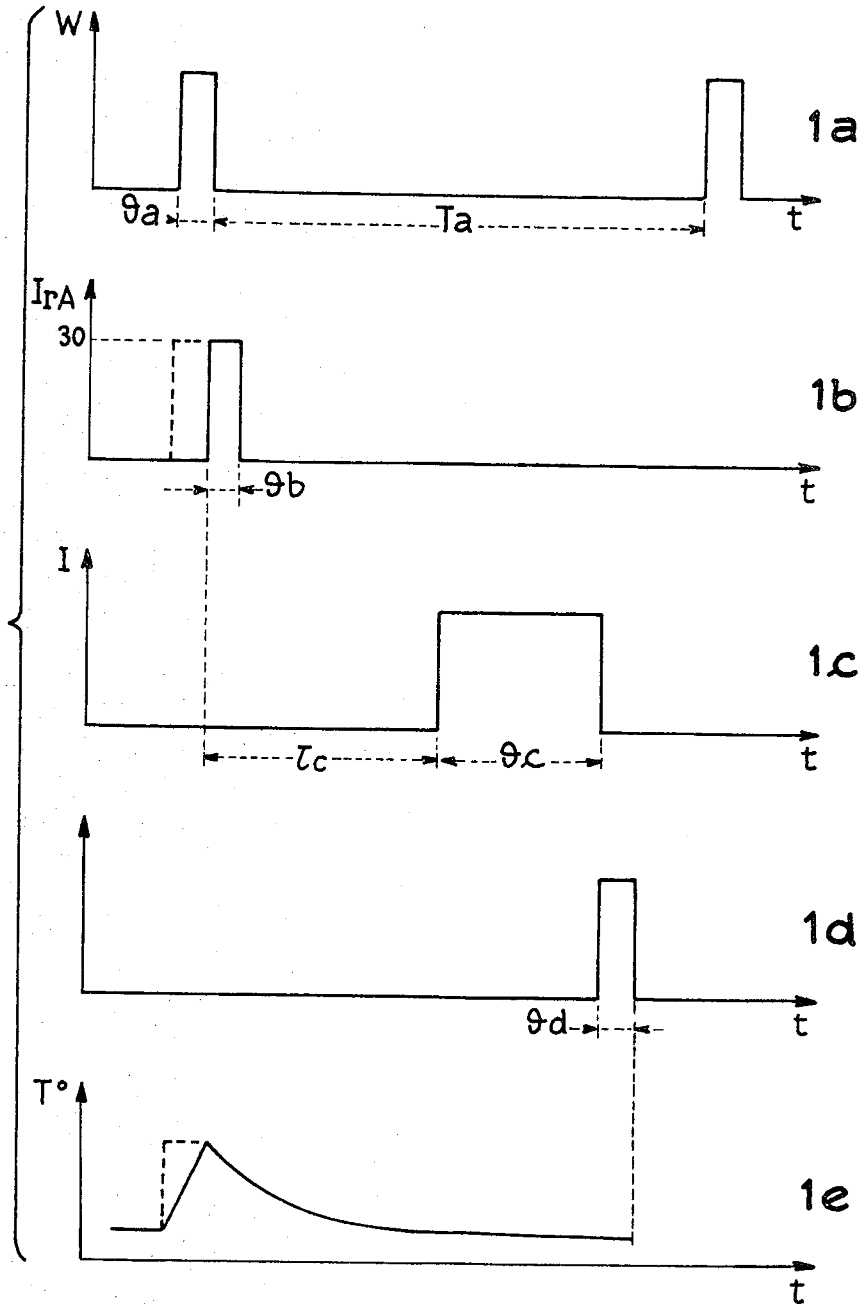

The analysing sequence shown in FIG. 1 by diagrams 1*a* to 1*d*, is offered by way of example, the read out and neutralising stages being capable of being performed by an electron beam having a high acceleration voltage, i.e. fast electrons, or by an electron beam having a lower acceleration voltage, i.e. containing slow electrons.

FIG. 1*a* illustrates graphically with the abscissae plotting time and the ordinates plotting amplitude, the distribution of the incident radiation energy in the form of a pulse of duration a, this being brought about for example by the use of a shutter or of a pulsed source. The duration of the pulse will, for example be of the order of some few nanoseconds to some few milliseconds. The radiation will for example be infrared radiation. The emitted pulses of incident radiation having a recurrence periodicity a. FIG. 1*b*, on a graph plotting time on the abscissae and intensity on the ordinates, illustrates the behaviour of the intensity of the electron beam scanning the pyroelectric target. FIG.1*b* illustrates the stage of neutralisation of the charges generated by the heating of the target under the effect to the incident radiation. During this neutralising stage, the target is thus scanned by an intense electron beam of low resolution, for a time $\theta$ b of the order of 1 millisecond for example.

In accordance with the invention, the stages of irradiating the target and neutralising the charges, can be simultaneous or may be offset by at most the duration of the irradiating stage. The neutralisation of the electrical charges generated by the heating of the target, is performed very fast since the highly defocussed electron beam makes it possible to instantaneously scan the whole of the target at a high intensity of several tens of microamps. The noise produced by this neutralisation is low since the use of a highly unfocussed beam corresponds to a narrow pass band.

During the neutralisation stage, the target is placed at a positive potential so that the neutralising current is large and the beam conductance likewise. FIG. 1*c* illustrates the actual phase of read-out of the signal recorded on the target. The abscissae and ordinate axes of diagram 1*c* are respectively gradiated in terms of time and electron beam intensity.

During the read-out stage, the pyroelectric target is scanned by the electron beam at a beam intensity which is low in relation to that of the beam used during the neutralising stage.

The waiting time $\tau c$ which has to elapse prior to read-out and during which the reconstitution of charges is equal quantity but opposite sign takes place at the target, thus giving rise to the storage effect, corresponds to the thermal time constant of the target, $\tau c$. The duration of the read-out stage $\theta c$ depends upon the read-out standard used and is conventionally in the order of 20 to 40 milliseconds.

During the read-out stage a boost in potential is applied to the target to ensure complete read-out of the charges and bring about an increase in the conductance g of the electron beam. FIG. 1*d* is a graph plotting time on the abscissae and intensity on the ordinates, to show the intensity of the electron beam during a compensating stage or charge-generating stage, which brings about a pedestal current. The compensating stage, coming at the end of the sequence of analysing of the target, is performed for example by scanning the target with a beam of fast electrons whose secondary emission coefficient $\delta$ is greater than 1 which enables compensation of the charges corresponding to the potential boost applied to the target during the read-out phase proper, to be effected in order to make it possible to commence with a new sequence. The compensating stage last approximately 1 millisecond. FIG. 1*e* illustrates the development of the temperature on the target during the analysing sequence. The heating of the target takes place during the irradiation time $\theta a$ and its cooling takes place in accordance with the theraml time constant $\tau c$ of the target.

Figure 2:
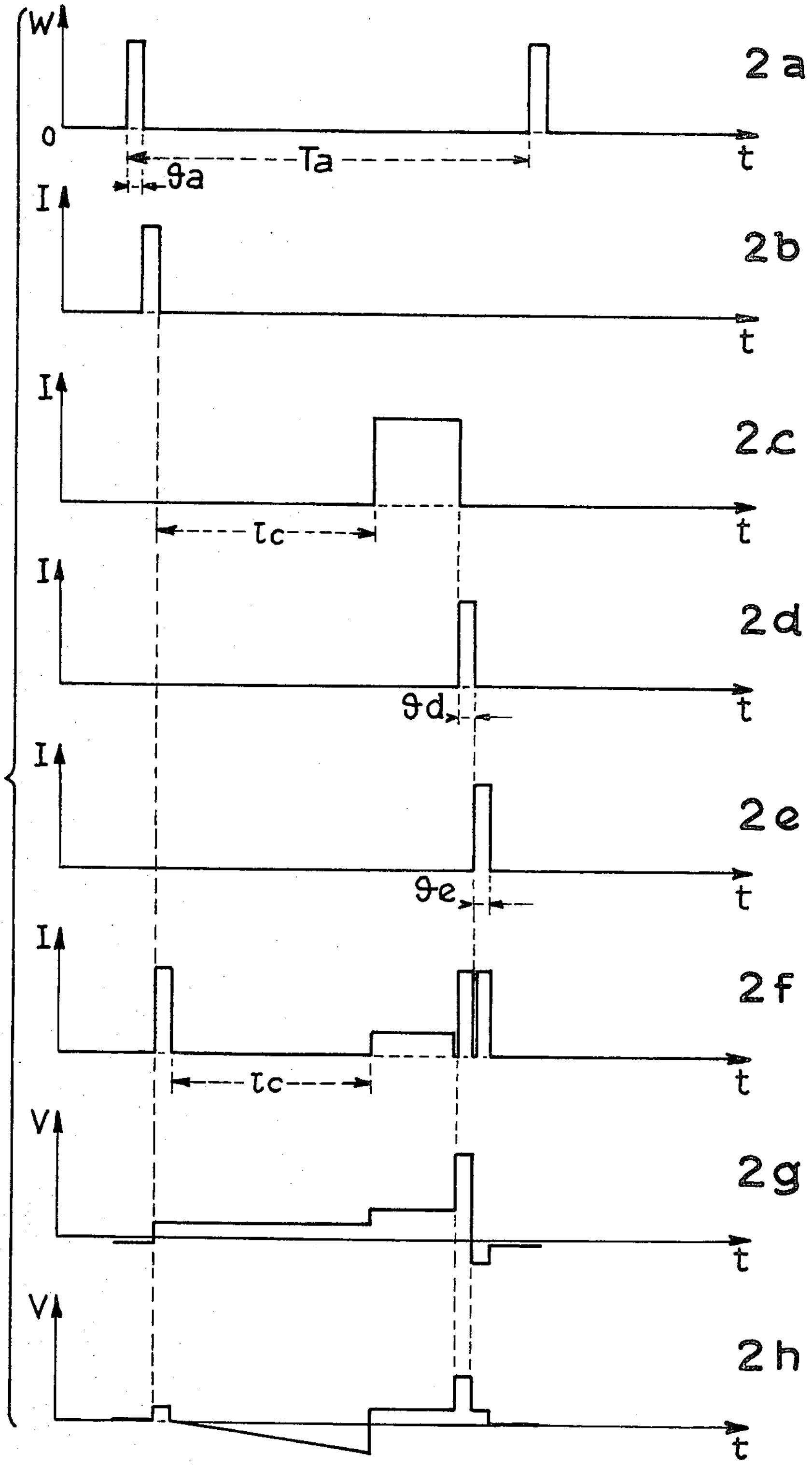

In accordance with a variant embodiment of the sequence of analysing of the pyroelectric target, as shown in FIG. 2, the compensating stage is followed by a stage in which potential equalisation is carried out by scanning the target with the beam of electrons after having applied a negative potential boost to it. The corresponding analysing sequence has been shown in FIGS. 2*a* and 2*h*.

FIG. 2*a* is a graph plotting time on the abscissae and amplitude on the ordinates, to show the distribution of the incident radiation energy. FIGS. 2*b*, 2*c* and 2*d* illustrate in a manner similar to those 1*b*, 1*c* and 1*d*, the stages of neutralisation, read out and compensation of the target. FIG. 2*e* illustrates the stage of equalisation of the target potential. During this stage, the target is scanned by a beam of slow electrons after the application of a negative potential. FIGS. 2*f* and 2*g* respectively illustrate the intensity of the scanning electron beam during the corresponding phases, as well as the voltages applied to the target, the abscissae axes of FIG. 2*f* and 2*g* being graduated in terms of time and their ordinates respectively in terms of intensity and potential difference.

In FIG. 2*f*, the ratio of the beam intensities during the stages of neutralisation compensation, equalisation and read-out, is of the order of 20, the corresponding values of the beam intensities being for example 100 microamps and 5 microamps.

As FIG. 2*g* shows, the positive potential boost applied to the target during the stages of neutralisation and read-out, are respectively of the order of 11 and 12 volts, and the positive potential boost applied during the compensating phase is of the order of 100 volts. The negative voltage boost applied to the target during the equalising phase is of the order of some few volts, for example 5 volts. FIG. 2*h* illustrates the variation of the potential on the face of the target which is disposed towards the electron-gun emitting the electron beam for scanning, during the course of the scanning sequence. This potential, which is negative during the time interval separating the stages of neutralisation and read-out, due to the appearance of negative charges in a quantity equal to the postive charges generated during heating, is brought to a value close to the zero original value during the equalisation stage. In accordance with a variant embodiment, the sequence of analysing of the target is modified so that read-out proper (read-out of the charges) is performed in a non-destructive manner. To this end, the pyroelectric target of the tube comprises, at that of its faces disposed towards the electron-gun, a network of metal electrodes and the free areas of the target, located between these metal electrodes, are placed at a negative potential in relation to the cathode of the electron-gun, during the read-out stage.

In all these cases, the storage of the signal on the target makes it possible to choose whichever read-out standard is best adapted to the particular application, for example an application such as spectrometry in which a high resolution is required, the sensitivity being a secondary characteristic to the extent that it is possible to regulate the level of the incident energy.

Figure 3:
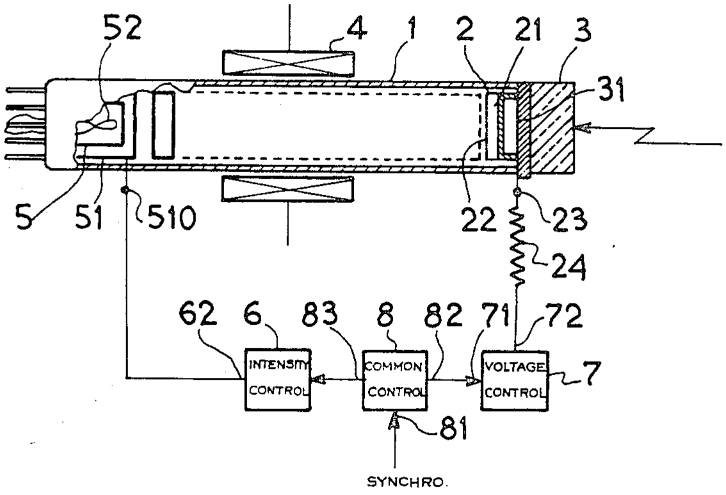
FIG. 3 illustrates a general diagram of the analysing device which forms the subject of the invention.

FIG. 3 relates to a device for analysing a pyroelectric target, in accordance with the invention.

The devices comprises within an evacuated envelope 1, a pyroelectric target 2. The evacuated envelope has been shown in perspective and exploded form in FIG. 3. The target 2 has a first face 21 disposed towards a zone 3 of the envelope 1, which is transparent vis-a-vis the incident radiation illustrated by a broken-line arrow. This zone 3 is constituted for example by a material which is transparent to infrared radiation. The evacuated envelope 1 also comprises means for carrying out electron beam scanning, which have been illustrated schematically at 4 by a deflection coil. The scanning means 4 makes it possible to cause an electron beam to scan a face 22 of the pyroelectric target which is opposite to its first face 21. The second face 22 is disposed towards means 5 generating at least one electron beam. The means 5 which generate the beam are constituted by a device of the electron-gun kind comprising an emissive cathode 5, a heating filament 52 and a modulating electrode 51. The generating means 5 are connected to means 6 for controlling the intensity of the emitted beam, by terminals 510 and 62. The pyroelectric target 2 is connected by the terminals 23 and 72 and by a load resistor 24, to voltage control means. To this end, the first face 21 of the pyroelectric target 2 is connected to a conductive electrode 31. The voltage control means 7 and the intensity control means 6 are connected by the terminals 82 and 83 to a common control circuit 8.

The common control circuit 8 has an input 81 connected to and fed with a synchronization signal representing the emission recurrences signals of the incident radiation.

In operation, the recurrences signals trigger the voltage control of the pyroelectric target 2, through the medium of voltage control means 7 in accordance with the sequence described for example in FIG. 2, and trigger the control of the intensity of emission through the medium of the emission intensity control means 6. The common control circuit 8 is for example constituted by a circuit for detecting the pulses of incident radiation furnishing at its output terminals 82 and 83 a train of pulses coded in accordance with the chosen analyzing sequence. The common control circuit 8 will for example comprise two monostable multivibrators whose metastable state has a duration equal to $\theta a = \theta d = 1$ milliseconds in the case of a first multivibrator and a duration equal to the time of the read-out stage proper, in the case of the second. These multivibrators are respectively triggered by the leading edge or trailing edge of the incident radiation pulse after detection, and then by the trailing edge of the signal furnished by the second multivibrator whose metastable state has a duration equal to the read-out stage. The second multivibrator is itself triggered by the trailing edge of the incident radiation pulse, following a delay corresponding to $\theta a + \tau c$. Any logic circuit which makes it possible to generate signals corresponding to the chosen analysing sequence, falls within the scope of the present invention.

These signals furnished, for example, by the two multivibrators, act in the circuit 6 controlling emission intensity, to control the switching of two control voltages applied to the modulating electrode 51 of the electron beam generating means 5. The generating means 5 are then consituted by an electron-gun with two emission states; a highly negative voltage makes it possible to reduce the emission intensity of the beam and its focussing, during the read-out phase proper, in a ratio of 20 in accordance with the scanning sequence described in FIG. 2.

The circuit of means 7 comprises a series of bias voltage generators. The signals generated by the common control circuit make it possible to switch these voltage generators which have voltage values of 11 volts; 12 volts; 100 volts; —5 volts; in accordance with the sequence shown in FIG. 2.

Figure 4:
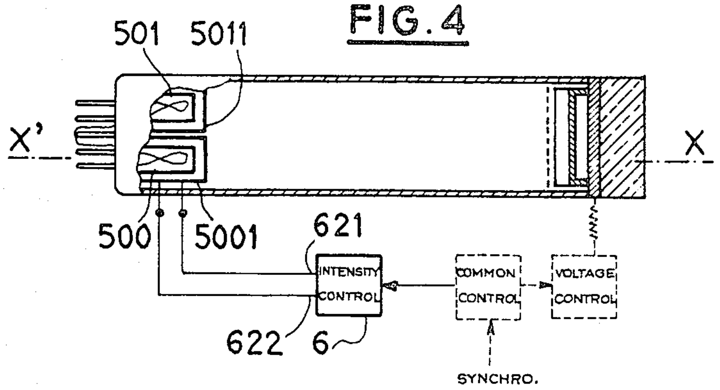
FIG. 4 illustrates a special embodiment of the device which forms the subject of the invention.

In accordance with a variant embodiment of the invention, shown in FIG. 4, the generating means 5 are constituted by two separate electron-guns, one marked 500 being used for read-out with high resolution and low intensity, and the other, marked 501, being used for the stages of neutralisation, compensation and potential equalisation, at low resolution and high intensity. Any combination relative to the use of electron-gun for the stages of neutralisation, read-out proper, compensation or equalisation, falls within the scope of the present invention. Preferably, the electron-gun 501 will be disposed beside that 500, the gun 500 and the target having axial symmetry in relation to the mean direction of the read-out beam X'X. The defocussing of the beam generated by the gun 501 allows it to illuminate the target despite its lateral offset. The circuit controlling the emission intensity is then modified in the following way: two output terminals 61 and 62 are respectively connected to the modulating electrodes 5001 and 5011 of the electron-guns 500 and 501. The circuit 6 controlling intensity comprises three voltage sources one of which, the most negative, makes it possible to halt emission from each electron-gun. The two other sources make it possible to respectively control the emission intensity of one of the electron-guns in accordance with the value determined for the sequence shown in FIG. 2. The switching of the control voltages is performed by the signals coming from the common control circuit 8.

The pyroelectric target will preferably be coated at its second face 22 with a thin film of an insulating material such as silicon oxide $SiO_2$ or magnesium fluoride, intended to improve its secondary emission properties and to prevent degradation of the pyroelectric material.

The signal obtained at the time of read-out, across the load resistor 24, is positive or negative depending upon the sign of the initial bias applied to the target.

Figure 5:
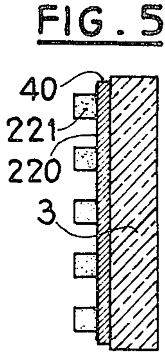
FIG. 5 illustrates a detail of the subject of the invention.

In accordance with a variant embodiment shown in FIG. 5, the second face 22 of the pyroelectric target comprises a network of metal electrodes 220 enabling non-destructive read-out of the electrical charges to take place. The second face 22 of the target 2 has free zones 221 of pyroelectric material located between the metal electrodes 220. The analysing sequence is then modified so that the free zones of the target are placed at a negative potential in relation to the cathode of the electron-gun. A particularly advantageous embodiment of the pyroelectric target, as shown in FIG. 5, consists of using a continuous electrode 40 to which studs 221 of pyroelectric material are attached. The second face 22 of the pyroelectric target thus forms a mosaic making it possible to improve the resolution and to operate non-destructive read-out. The pyroelectric target comprising a thin metal film 40, is connected to a rigid support constituted for example by the internal face of the entry window 3 of the evacuated envelope which is transparent to infrared radiation and constituted by materials such as Ge, Si, KRS 5, As2 Se3, As2 Se5. These latter two have a low thermal conductivity.

The incident radiation energy being absorbed by the pyroelectric material and the pyroelectric effect being quas-instantaneous, the facility thus created for neutralising the signal during the incident radiation pulse or immediately it has ended, avoids any loss of sensitivity due to thermal conduction in the support.

This embodiment thus makes it possible to improve the robustness of the mechanical assembly of the target and to suppress parasitic signals of piezoelectric origin accompanying the mechanical vibration of a self-supported target.

Of course, the invention is not limited to the embodiments described and shown, which were given solely by way for example.

What is claimed is:

1. A method for analyzing a pyroelectric target comprising the steps of heating up the pyroelectric target by an incident radiation to generate electrical charges;

storing of the signals recorded on the target said heating up step, by neutralising said electrical charges, cooling said pyroelectric target, reading out said signals from said pyroelectric target, scanning of the target by an electron beam causing both neutralising and reading out of said signals, respectively.

2. A method for analysing a pyroelectric target as claimed in claim 1 wherein said step of neutralising of said electrical charges is performed by scanning said pyroelectric target with a high intensity low resolution electron beam, said pyroelectric target being placed at a positive potential during said step of neutralizing.

3. A method for analysing a pyroelectric target as claimed in claim 1 wherein said step of reading out is performed by scanning the pyroelectric target by an electron beam of high resolution and low intensity, said target during said step of reading out being placed at a positive potential higher than the potential on the target during said step of neutralizing.

4. A method of analysing a pyroelectric target which receives incident radiation comprising the steps of (a) exposing said target to incident radiation, thereby heating said target and inducing electrical charges to form in a pattern in accordance with said received radiation;

(b) storing said pattern before said target cools by neutralizing said electrical charges induced in said target by scanning said target with an electron beam of low resolution and high intensity, said storage being done simultaneously with or immediately after said exposing;

(c) cooling said target; and then (d) reading out said target by scanning said target with an electron beam of high resolution and low intensity.

5. A method according to claim 4 wherein said cooling step is waiting for the target to cool and exceeds the time constant $Te=a^2/4\ \pi^2D$; where a=is the pitch of the target, and D=heat diffusion constant of the material.

6. A method according to claim 4 wherein said exposing has a duration of a few nano seconds to a few milliseconds, said storing-neutralization electron beam exposure is on the order of 1 millisecond; and said read-out electron beam scanning is from 20 to 40 milliseconds.

* * * * *